United States Patent [19]
Nagasawa et al.

[11] Patent Number: 5,848,050
[45] Date of Patent: Dec. 8, 1998

[54] OPTICAL DISK HAVING A CONTINUOUS RECORDING TRACK FORMED OF ALTERNATING LAND AND GROOVE REVOLUTIONS

[75] Inventors: Masato Nagasawa; Kazuhiko Nakane; Tsuyoshi Katayama; Koiti Komawaki; Yoshinobu Ishida, all of Tokyo, Japan

[73] Assignee: Mitsubishi Denki Kabushiki Kaisha, Tokyo, Japan

[21] Appl. No.: 799,421

[22] Filed: Feb. 12, 1997

[30] Foreign Application Priority Data

Feb. 13, 1996 [JP] Japan ................................. 8-025233

[51] Int. Cl.⁶ .......................................................... G11B 7/24
[52] U.S. Cl. ........................................ 369/275.4; 369/275.3
[58] Field of Search ............................. 369/275.4, 275.2, 369/275.3, 58, 44.26, 44.29, 44.13, 278, 13, 53, 54, 124, 279, 275.1

[56] References Cited

U.S. PATENT DOCUMENTS

| | | |
|---|---|---|
| 5,268,887 | 12/1993 | Honguh et al. .................. 369/44.13 |
| 5,270,998 | 12/1993 | Uchiumi ............................ 369/277 |
| 5,377,178 | 12/1994 | Saito et al. ....................... 369/124 |
| 5,448,551 | 9/1995 | Miyagawa et al. ............... 369/271 |
| 5,448,552 | 9/1995 | Onagi ............................. 369/275.4 |
| 5,481,530 | 1/1996 | Ueda et al. .................... 369/275.1 |
| 5,493,552 | 2/1996 | Kobori ............................. 369/109 |
| 5,615,185 | 3/1997 | Horikiri ......................... 369/44.13 |
| 5,615,205 | 3/1997 | Belser ............................ 369/275.4 |

*Primary Examiner*—Ali Neyzari

[57] ABSTRACT

In an optical disk having information recording tracks of lands and grooves, the grooves are wobbled in a radial direction of the disk so as to represent rotation information and sector management information, at least one pair of a wobbling part and an unwobbling part arranged one after another are provided every revolution, such that the wobbling parts in the grooves next to each other do not overlap in the radial direction of the disk. Since the wobble parts in the grooves next to each other do not overlap in the radial direction, the wobble data can be obtained regardless of whether a beam spot is tracing a land track or a groove track, and even in a data part of each sector.

14 Claims, 13 Drawing Sheets

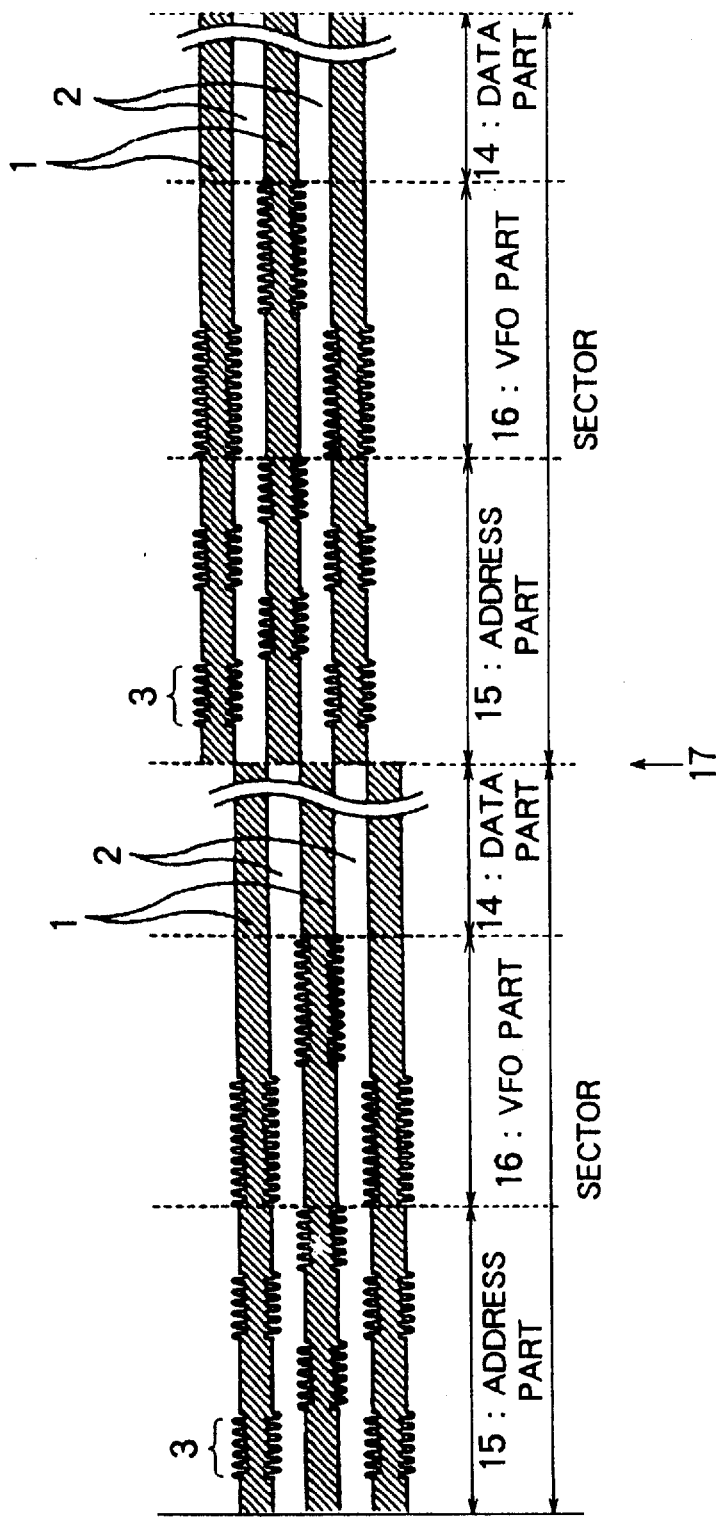

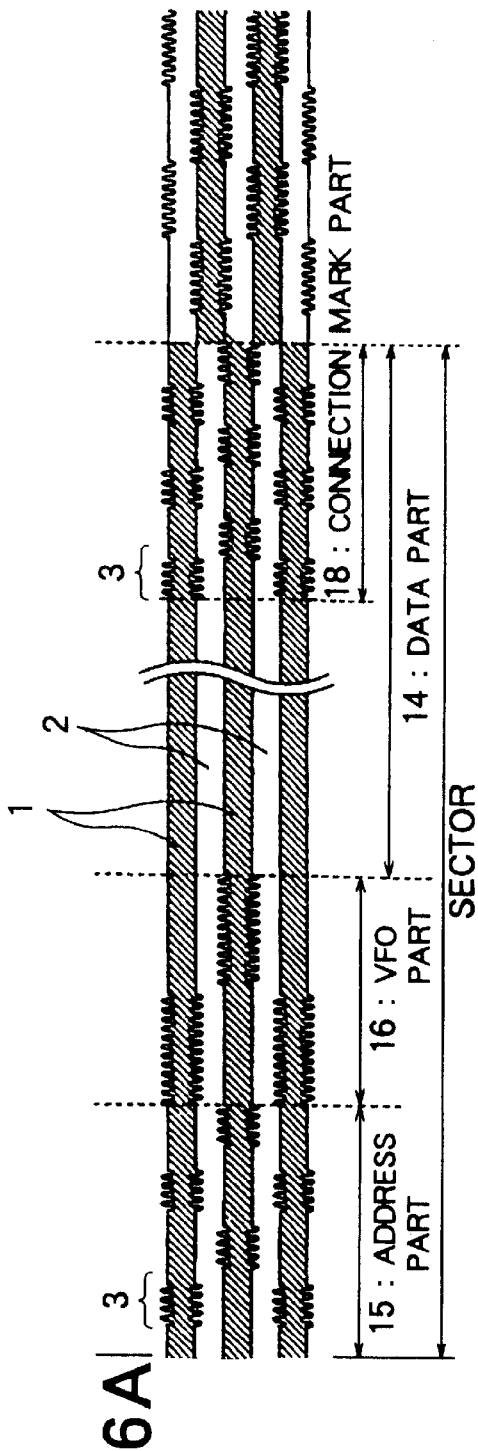
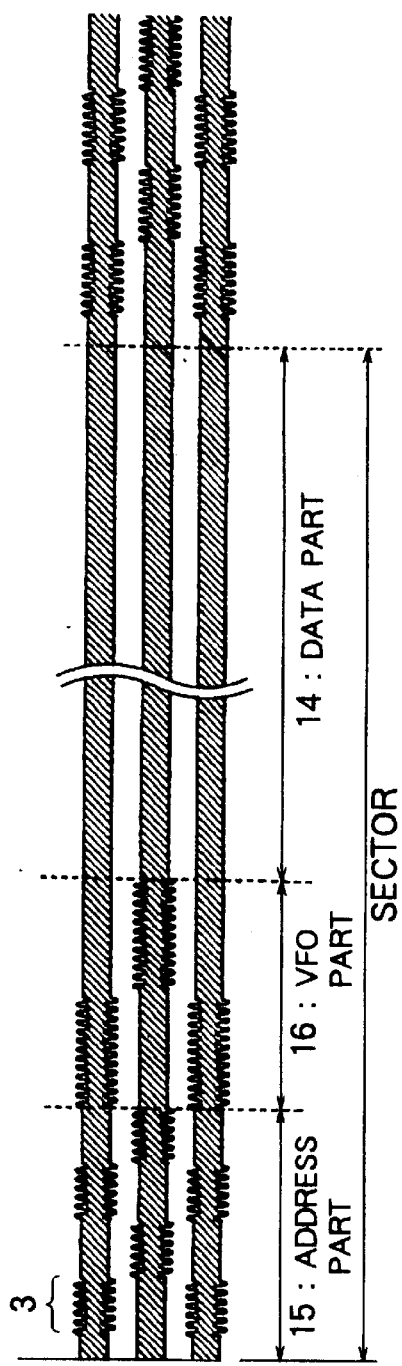

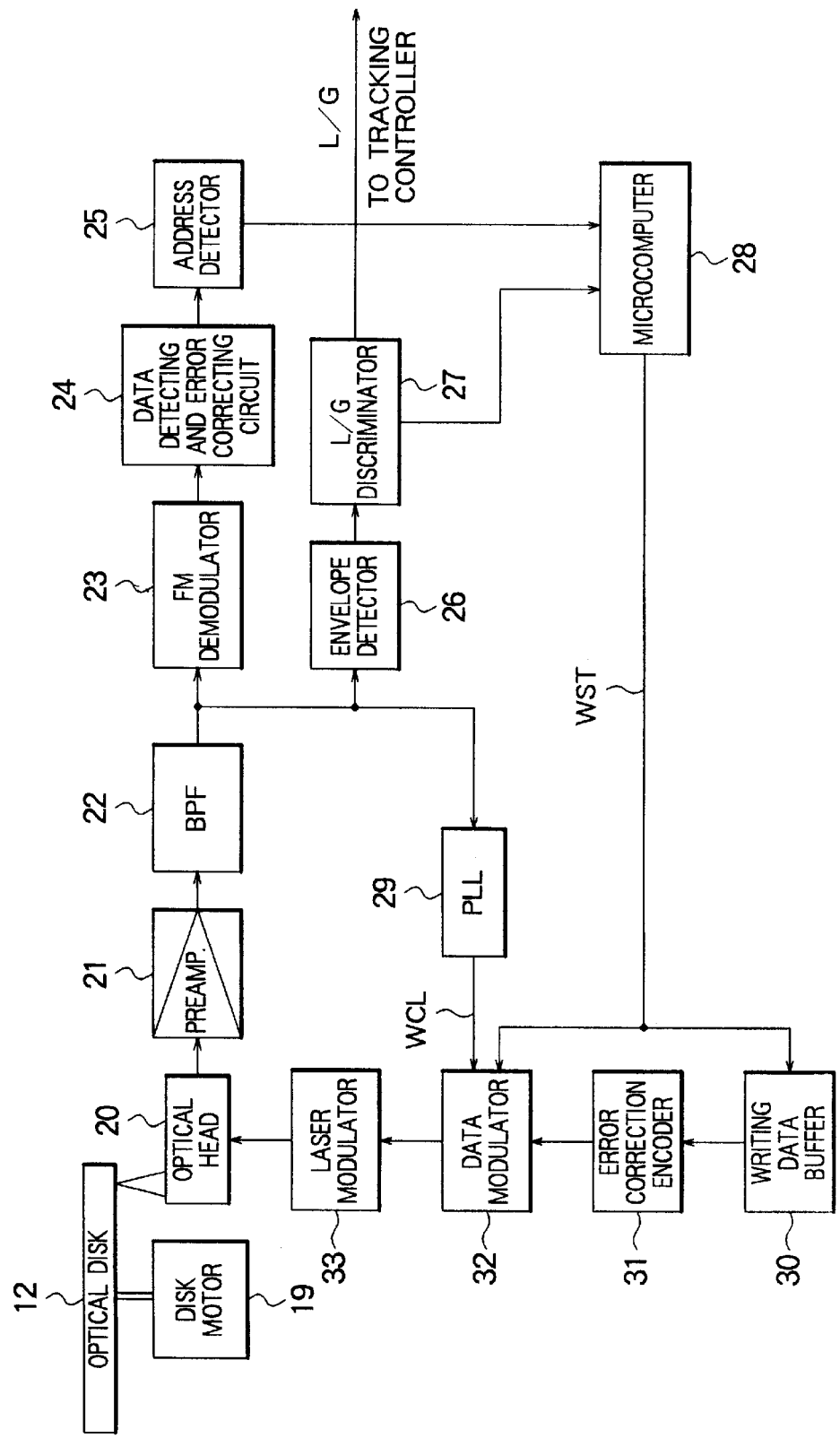

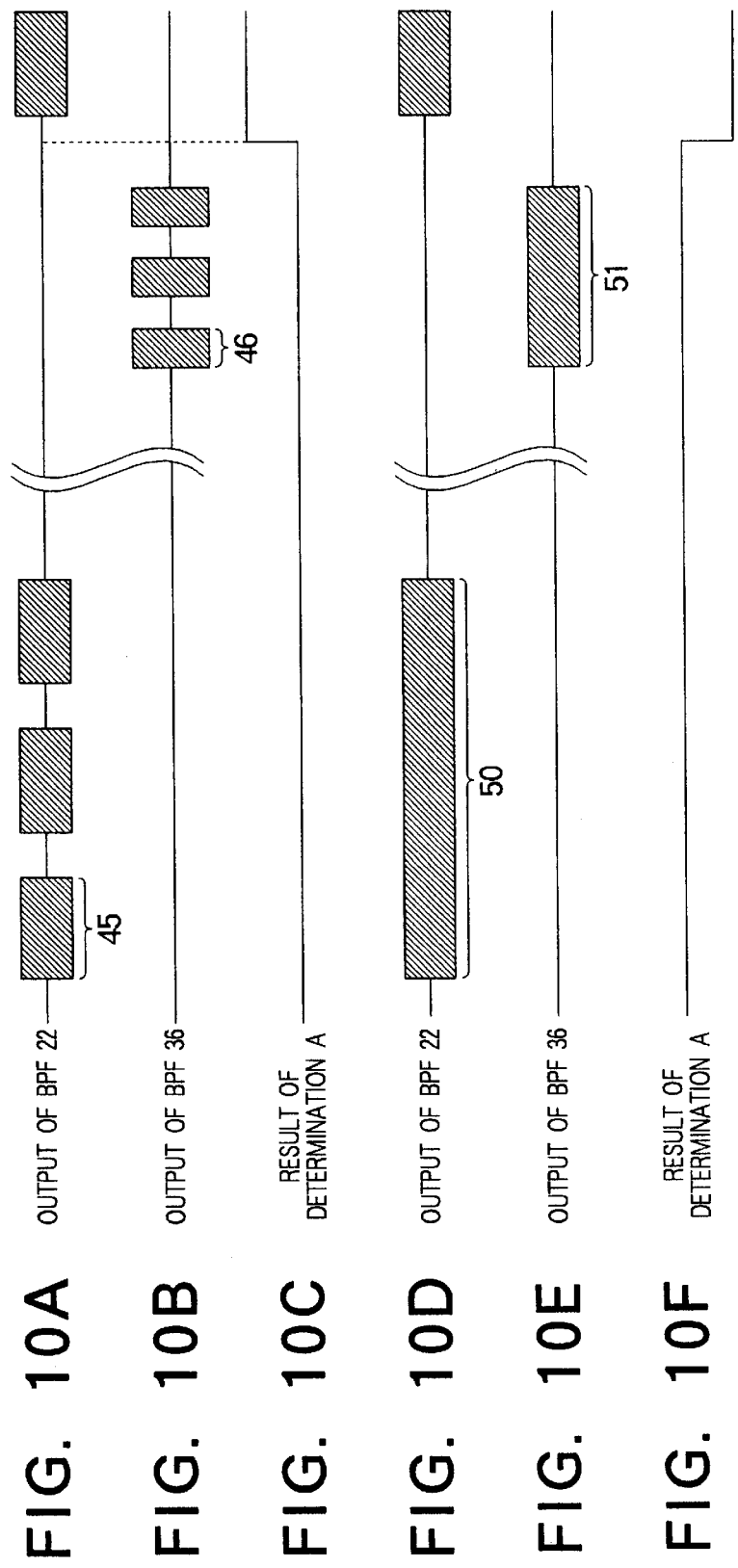

OPTICAL DISK HAVING A CONTINUOUS RECORDING TRACK FORMED OF ALTERNATING LAND AND GROOVE REVOLUTIONS

BACKGROUND OF THE INVENTION

The present invention relates to an optical disk having land and groove tracks in which information is recorded. The invention also relates to an optical disk drive apparatus which uses the optical disk.

In conventional phase-change type optical disks, information is recorded on the groove tracks alone. Lands are used to guide the laser beam for tracking and to reduce crosstalk from adjacent groove tracks. If information is recorded on the lands as well, the width of the grooves need not changed, and yet the track density can be doubled. However, the crosstalk from the adjacent groove tracks will increase. Consequently, it was thought that use of lands as well for data recording would not increase the recording density. With respect to the crosstalk from adjacent groove tracks, it has been found that the crosstalk from adjacent groove tracks can be restrained by setting the depth of the grooves to be around $\lambda/6$ ($\lambda$ represents the wavelength of the light source). By determining the depth of the grooves as such, and using both of the lands and grooves for data recording, the recording density of the optical disk can be enhanced. The use of the lands and grooves for data recording also facilitates mastering of optical disks. In accordance with this recording method which uses both of the lands and the grooves, and which will be hereinafter referred to as the land-groove recording, the mastering of optical disks is easier than if only the grooves are used for recording and a track pitch is reduced.

FIG. 11A is a diagram showing configurations of tracks in a conventional optical disk for which the land-groove recording is performed. Referring to FIG. 11A, reference numeral 1 denotes grooves serving as tracking guides, and 2 denotes lands disposed between the grooves 1. Each revolution of track is divided into sectors having header parts 13 at the leading end of each sector. In the illustrated example, each revolution of track is divided into eight sectors, and the header parts 13 are aligned in the radial direction. As shown in FIG. 11A, an optical disk in which information is recorded on lands as well as on grooves have concentric tracks, and after recording of one revolution of track, a jump is made to a next track (for example, a jump is made from a groove track to an adjacent land track) and, writing on the track (land track) to which the jump has been made is started. Each sector is managed by the sector address, so that for the purposes of recording and reproducing data which may be discontinuous, such as computer data, operation is performed using a buffer memory or the like, without problems.

The application of optical disks, however, is not limited to recording and reproducing computer data alone. Rewritable optical disks are often needed for recording continuous data such as motion picture data and music data. Especially for multimedia applications which require the processing of both computer data and video/audio data integrated thereinto, spiral tracks, shown in FIG. 11B, similar to those of compact disks, rather than concentric tracks, may be used to facilitate the processing of the continuous data contained therein. When, however, the land and groove tracks form separate tracks as shown in FIG. 11B, information is recorded on one of the land and groove spirals first, and at the end of the above-mentioned one of the land and groove tracks, a jump is made to the start of the other of the land and groove spirals. This jump is made from the inner periphery of the disk to the outer periphery of the disk, for example, and tracking must be switched between the land and groove tracks. A certain time delay is required for such a jump. In a type of a disk in which the recording area of the disk having tracks divided into a plurality of annular zones, the jump is made between the inner and outer peripheries of each zone. In this case, the time required for the jump is shorter, but is still considerable.

FIG. 11C shows a still another example of configurations of tracks in conventional optical disk for which the land-groove recording is performed. The illustrated disk has groove track 1 and land tracks 2 connected every revolution to form a continuous recording spiral in which groove and land tracks alternate every revolution. Each revolution of track is divided into sectors having header parts 13 at the leading end of each sector. In the illustrated example, each revolution of track is divided into eight sectors, and the header parts 13 are aligned in the radial direction. One 13a of the eight header parts 13 in each revolution of track is at a connecting point between the land and groove tracks adjacent to each other.

With this disk, the data is recorded continuously, from the inner end to the outer end of the single spiral.

FIG. 12A and FIG. 12B respectively show details of the header part in a conventional optical disk for which the land-groove recording is performed. FIG. 12A shows the case where a header is provided separately for the land tracks and the groove tracks. FIG. 12B shows the case where a header is provided in the area on the boundaries between the land tracks and the groove tracks. In FIG. 12A and FIG. 12B, address pits are indicated by reference numeral 4.

A header part 13 includes embossments or prepits physically formed to represent the address data of a sector which is a data recording unit. More specifically, pits equal in height to the lands or pits equal in depth to the grooves are formed in the header part where no grooves are formed. Several methods of forming prepits suitable for the land-groove recording have been conceived. Among those, the following two methods are mainly used. In one method, dedicated addresses are provided for the individual sectors in land and groove tracks, as shown in FIG. 12A. In the other method, addresses are shared by two sectors in land and groove tracks adjacent to each other, as shown in FIG. 12B.

In the method shown in FIG. 12A, dedicated prepits are formed for each sector of the land tracks and the groove tracks. The dedicated prepits can record much information such as the one indicating whether the sector for which the dedicated prepits are formed is on a land track or a groove track. Thus, control of the optical disk is facilitated. The width of the prepits, however, needs to be sufficiently narrower than the track pitch. A laser beam which is different from the laser beam used for forming the tracks must be used to form the prepits, and the structure of the recording medium should therefore be complex.

In the second prepit forming method, the prepits are positioned on an extension of a boundary between land and grooves adjacent to each other, and shared by the sectors in the land and groove tracks. By using the same laser beam as that for forming the tracks and by shifting the laser beam by half a track pitch (a full track pitch being defined as the distance between the centers of the land and groove tracks adjacent to each other) laterally, i.e., in the radial direction, prepits can be formed. However, when exercising control of the optical disk, it is necessary to determine whether the sector for which the prepits are formed is on a land track or a groove track. Therefore, sophisticated control of the optical desk is needed.

In conventional writable optical disks mainly recording continuous data, which includes a CD-R (Compact Disc Recordable) or an MD (Mini Disk), wobbling grooves as shown in FIG. 13 are used for rotation control of the disk and address management during data recording. In the case of conventional compact disks used solely for reproducing data, a rotation control signal can be obtained from the pit sequence of the reproduced data. Since these compact disks are not used for recording data, sector address management information is not needed. On the other hand, in the case of writable optical disks, rotation control of the disks and data address management during data recording are needed.

In the case of the above-mentioned CD-R and MD, the wobble pits are formed by wobbling the laser beam when the disk is cut, and sector address management information is added by frequency-modulating the wobble. When data writing or recording is performed, the wobble signal is extracted from a tracking error signal and frequency-demodulated to obtain the sector address management information. In addition, rotation control of the disk motor is performed so as to maintain the frequency of the wobble signal constant.

In the above-mentioned groove wobbling method, since the wobble data can contain sector management information such as the sector address information, no dedicated address pits are needed. Thus, the data writing efficiency can be all the more enhanced. In addition, since the rotation control data of the disk during data recording can also be extracted from the wobble signal, the CLV (Constant Linear Velocity) rotation control method or the like which is effective for continuous data writing can now be employed.

However, the above-mentioned groove wobbling method is used when recording and reproducing data on the groove tracks only. In this case, lands are merely used to obtain a tracking signal. To date, no attempt has been made to further improve the recording density in connection with disk in which information is recorded on both lands and grooves.

In the above-mentioned conventional optical disks such as the CD-R or MD, sector address management information and a disk rotation control signal are obtained using wobbled grooves during data recording, the optical head access is made even in the area storing no data. If this data access method is applied to the high-density recording system which uses both lands and grooves for recording, it is possible to obtain wobble information in the form superimposed on the tracking error signal when groove tracks are traced. However, data represented by (the edges of) the wobbling grooves disposed on opposite sides of a land track are different from each other, so that the wobble data for the land track cannot be obtained. Even if the data of (the edges of) the wobbling grooves on opposite sides of a land track are made identical, it cannot be determined whether the beam spot is scanning a land track or a groove track. For this reason, sector management information cannot be obtained, and the rotation control of the disk motor cannot be performed properly.

In the case of the optical disk having a spiral configuration in which a land track and a groove track alternate every revolution, it is necessary to determine whether the sector appearing next is in a land track or a groove track. Unless this determination is correct, tracking will fail. Thus, the correct land/groove discrimination is required. In addition, since a tracking polarity is reversed every revolution, the tracking error signal direction is be reversed every revolution. Thus, it may lead to a counting error in the counting operation which uses the tracking error signal during a track access, or a failure of pull-in in the track jump. When the boundaries between adjacent zones are not detected during track access, the CLV control is performed after track-on to a track at an end of a zone. Consequently, it will take a longer time for the settlement of a tracking operation. In order to avoid such a problem, the land/groove discrimination and the current zone detection need to be made, even when tracking is not achieved.

Furthermore, when the recorded data is in an arrangement of a continuous data of a comparatively high signal rate, as is video data, the conventional track configurations are encountered by the following problems. That is, when continuous data is recorded or reproduced from a track formed of concentric land and groove tracks, a track jump must be performed every revolution. This imposes a limitation to the recording data rate. On the other hand, in the case of an optical disk having spiral land and groove tracks, after the entire land track has been recorded, from the inner to the outer peripheries, for example, an access is made from the outer end of the land track to the inner end of the groove track. During such a jump, recording is interrupted, and the recording speed is abruptly decreased at such a jump.

SUMMARY OF THE INVENTION

The present invention has been made to solve the above-mentioned problems.

It is therefore an object of the present invention to provide an optical disk which allows increase in the recording density through the use of both lands and grooves for recording, and from which sector management information and rotation control information can be obtained by wobbling grooves, and which enables easy and reliable determination as to whether the beam spot is scanning a land track or a groove track.

It is another object of the present invention to provide an optical disk from which sector management information can be extracted without fail, and with which it is possible to generate stable writing clock.

It is still another object of the present invention to provide an optical disk in which lands and grooves alternate every revolution, and with which it is possible to detect the track polarity reversal position easily and without fail.

It is a further object of the invention to provide an optical disk drive apparatus for the optical disks achieving the above objectives.

According to one aspect of the invention, there is provided an optical disk having grooves physically formed on a surface of the disk and lands between the grooves, the information recording tracks comprising a plurality of track sectors respectively forming information recording units; wherein the grooves are wobbled in a radial direction of the disk so as to represent rotation information of the disk and sector management information such as an address of each of the track sectors, wherein at least one pair of a wobbling part and an unwobbling part arranged one after another are provided every revolution, such that wobbling parts in the grooves next to each other do not overlap in the radial direction of the disk, Since the wobble parts in the grooves next to each other do not in the radial direction, the wobble data can be obtained regardless of whether a beam spot is tracing a land track or a groove track, and even in a data part of each sector.

If the wobbles are provided for each sector, it is possible to obtain address information which is distinct for each of the land and groove tracks, so that it is possible to determine whether a tracking being traced is a land track and a groove track, and identify each track by the address information.

The configuration described above also permits address management information such as sector address data to be preformatted in the form of wobble, so that it is not necessary to provide dedicated address pits. As a result, the data writing efficiency can be enhanced.

Where no dedicated address pits are provided, and if disks, such as phase-change type disks, allowing reproduction by reflectivity change are used, and the data recording format is set to be the same as the standardized format of a play-only disk, compatibility in reproduction is ensured, and reproduction is effected by a play-only apparatus which is primarily intended for reproduction of conventional play-only disks.

Furthermore, since wobble data can be reproduced as separate address information during land tracing and during groove tracing, distinction between land and groove tracks can be made without fail.

It may be so configured that the tracks on the disk are divided into a plurality of annular zones, and each sector includes a wobbling part and an unwobbling part one after another.

With the above configuration, the sectors in each zone are aligned in the radial direction of the disk, so that the combination or combinations of the wobbling and unwobbling parts can also be aligned in the radial direction.

Moreover, each combination or pair of a wobbling part and an unwobbling part can be completed within each sector.

Thus, sector management information including sector address data, and information regarding the record start position can be obtained.

If the combination of the wobbling part and unwobbling part are at the leading end of each sector, the address can be obtained at the leading end of the sector, and the sector start position can be identified based on the envelope of the reproduced signal from the wobble.

The groove wobble may include a first part which is modulated with sector management information, and a second part which is not modulated, and said second part is at the start of the sector.

Accordingly, the wobble signal alone can be separated from recorded data, by the use of a bandpass filter, during recording or reproduction. The sector management information can be extracted reliably and accurately. Accurate writing clock can be generated based on the wobble (VFO part) which is not modulated.

It may be so configured that
the tracks on the disk are divided into a plurality of annular zones,
land and groove tracks alternate every revolution to form a continuous information recording spiral, and
a track sector immediately before a connecting point between a land and groove tracks has a connection mark part formed of a wobbling part whose wobbling period is different from the wobbling period of the wobble representing the sector management information and the wobble representing the disk rotation information.

With the above configuration, the sectors in each zone are aligned in the radial direction of the disk, so that the combination or combinations of the wobbling and unwobbling parts can also be aligned in the radial direction.

Moreover, since land and groove tracks alternate every revolution to form a continuous spiral, even when the data, such as video data, which requires a comparatively high signal rate, are to be written or read out, no track jump is needed, and interruption in the data recording or reproduction due to a track jump can be eliminated.

Furthermore, since a track sector immediately before a connecting point between a land and groove tracks has a connection mark part formed of a wobbling part whose wobbling period is different from the wobbling period of the wobble representing the sector management information and the wobble representing the disk rotation information, the wobble signal from the connection mark part can be extracted, by the use of a bandpass filter having a passband blocking the wobble signal from the the sector management information and the like, while passing only the wobbling signal from the connection mark part, and based on the extracted wobble signal, the land/groove polarity switching can be effected easily and without fail.

It may be so configured that
the tracks on the disk are divided into a plurality of annular zones,
land and groove tracks alternate every revolution to form a continuous information recording spiral, and
the total length of an wobbling part and an unwobbling part which are arranged one after another in at least a part of a sector immediately before a connecting point is different from the total length of a wobbling part and an unwobbling part which are arranged one after another in other sectors.

With the above configuration, the sectors in each zone are aligned in the radial direction of the disk, so that the combination or combinations of the wobbling and unwobbling parts can also be aligned in the radial direction.

Moreover, since land and groove tracks alternate every revolution to form a continuous spiral, even when the data, such as video data, which requires a comparatively high signal rate, are to be written or read out, no track jump is needed, and interruption in the data recording or reproduction due to a track jump can be eliminated.

Furthermore, since the total length of a wobbling part and an unwobbling part arranged one after another in at least a part of a sector immediately before a connecting point is different from the total length of a wobbling part and an unwobbling part arranged one after another in the corresponding part in other sectors, determination as to whether a following sector is at a connecting point can be made by detecting the above-mentioned total length. The determination can therefore be made easily and without fail, and tracking polarity reversal can accordingly be effected without fail.

According to another aspect of the invention, there is provided an optical disk drive apparatus using an optical disk having grooves physically formed on a surface of the disk and lands between the grooves, the information recording tracks including a plurality of track sectors respectively forming information recording units, with the grooves are wobbled in a radial direction of the disk so as to represent rotation information of the disk and sector management information such as an address of each of the track sectors,
the apparatus including:
a wobble signal detecting circuit for extracting, from a tracking error signal, a signal due to the wobble; and
a land/groove determining circuit being responsive to an output of said detecting circuit, and determining that the track being traced is a land track when the wobble is detected continuously, and determining that the track being traced is a groove track when the wobble is detected intermittently.

With the above configuration, it can be determined easily whether a track being traced is a land track or a groove track, and access to a track (a land track or a groove track) can be made without fail.

It may be so configured that the land and groove tracks in the disk alternate every revolution to form a continuous information recording spiral, a track sector immediately before a connecting point between a land and groove tracks has a connection mark part formed of a wobbling part whose wobbling period is different from the wobbling period of the wobble representing the sector management information and the wobble representing the disk rotation information, and the apparatus further includes:

a connection mark part wobble signal detecting circuit for extracting, from the tracking error signal, a signal due to the connection mark part; and a circuit being responsive to the output of said connection mark part wobble signal detecting circuit, and detecting a connecting point, and causing reversal of a tracking polarity.

With the above arrangement, connecting points can be detected easily, and tracking polarity can be reversed without fail.

It may be so configured that the land and groove tracks in the optical disk alternate every revolution to form a continuous information recording spiral, and the total length of a wobbling part and an unwobbling part which are arranged one after another in at least a part of a sector immediately before a connecting point is different from the total length of a wobbling part and an unwobbling part which are arranged one after another in other sectors, the apparatus further comprises:

a length detecting circuit being responsive to the output of said wobble signal detecting circuit, and detecting said total length; and a connecting point detecting circuit being responsive to the output of the length detecting circuit, and detecting a connecting point, and causing reversal of a tracking polarity.

With the above arrangement, connecting points can be detected easily, and tracking polarity can be reversed without fail.

According to another aspect of the invention, there is provided an optical disk drive apparatus using an optical disk having grooves physically formed on a surface of the disk and lands between the grooves, the information recording tracks comprising a plurality of track sectors respectively forming information recording units, with the grooves being wobbled in a radial direction of the disk so as to represent rotation information of the disk and sector management information such as an address of each of the track sectors, the apparatus including:

a wobble signal detecting circuit for extracting, from a tracking error signal, a signal which has been produced from the wobble; and a clock generating circuit being responsive to an output of said detecting circuit, and generating a reference clock for write data based on an output of said detecting circuit.

With the above arrangement, recording pits can be formed accurately regardless of the fluctuations in the disk rotation during data recording. Further, even when the optical disk is rotated at a constant angular velocity and regardless of whether data is written on a land track or a groove track, data writing can be performed with a constant linear recording density.

It may be so configured that the groove wobble in the disk include a first part which is modulated with sector management information, and a second part which is not modulated, and the second part is at the start of the sector;

the apparatus further comprises an unmodulated wobble signal detecting circuit being to the output of the wobble signal detecting circuit, and extracting the wobble signal due to said second part; and the clock generating circuit generates said reference clock based on the wobble signal from the unmodulated wobble.

With the above arrangement, more stable and more accurate write clock can be obtained, and recording pits can be formed more accurately regardless of fluctuations in the rotation of the disk, during recording.

According to a further aspect of the invention, there is provided an optical disk having grooves physically formed on a surface of the disk and lands between the grooves, information recording tracks being formed both in the grooves and on the lands, the information recording tracks having a plurality of track sectors respectively forming information recording units; wherein the information recording tracks include intermittent wobble regions, and the wobble regions include regions which are not frequency-modulated, whereby, during playback of signals, the disk is rotated so that the frequency of the wobble signal from the wobbling regions of the tracks is kept constant, and during recording of signals, a reference clock used for writing data is generated on the basis of the wobble signal reproduced from the regions which are not frequency modulated.

According to a further aspect of the invention, there is provided a method of reproducing information from an optical disk having grooves physically formed on a surface of the disk and lands between the grooves, information recording tracks being formed both in the grooves and on the lands, the information recording tracks having a plurality of track sectors respectively forming information recording units, the information recording tracks including intermittent wobble regions, the method including the steps of:

reproducing the wobble signal from the wobble regions of the tracks;

detecting an envelope of the reproduced wobble signal;

extracting timing signals from the detected envelope; and determining the timing for switching between lands and grooves on the basis of the extracted timing signal.

BRIEF DESCRIPTION OF THE DRAWINGS

These objects and features of the present invention will best be understood from a detailed description of preferred embodiments thereof, selected for purposes of illustration and shown in the accompanying drawings in which:

FIG. 5 shows configurations and a sector format of track sectors in an optical disk according to the fourth embodiment of the present invention;

FIG. 6A and FIG. 6B show configurations and a sector format of track sectors in an optical disk according to the fourth embodiment of the present invention;

FIG. 7 is a block diagram showing a structure of an optical disk drive apparatus according to the fifth embodiment of the present invention;

FIG. 10A to FIG. 10F show signals from two bandpass filters and a tracking polarity reversal circuit in an optical disk drive apparatus according to the seventh embodiment of the present invention;

DETAILED DESCRIPTION OF THE PREFERRED EMBODIMENTS

The embodiments of the present invention will now be described with reference to the appended drawings.

First Embodiment

Figure 1:
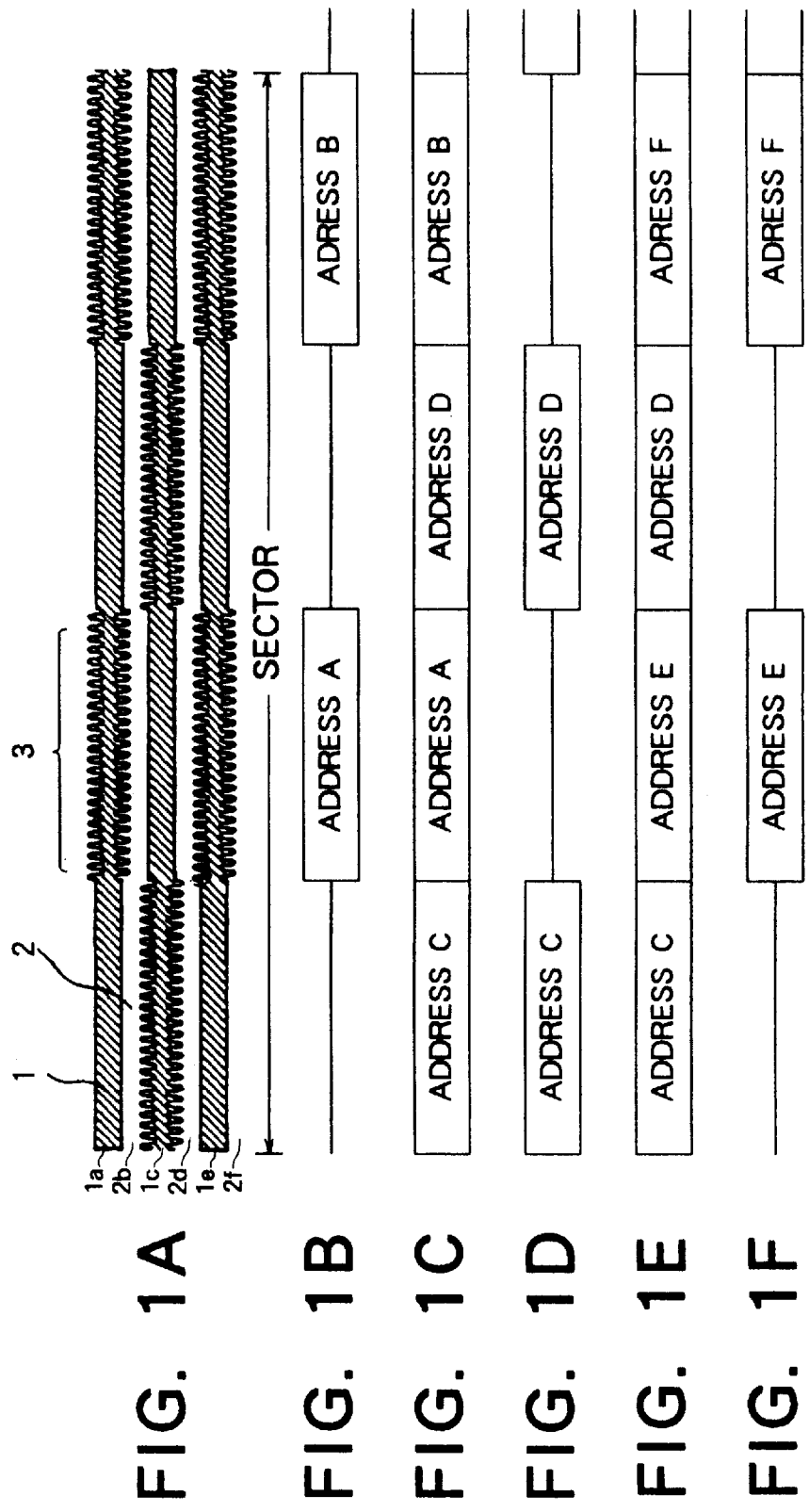
FIG. 1A shows configurations of track sectors in an optical disk according to the first embodiment of the present invention.
FIG. 1B to FIG. 1F are time charts showing the data produced when the corresponding parts of the tracks in FIG. 1A are scanned by the beam spot.

FIG. 1A shows configurations of tracks in an optical disk, and FIG. 1B to FIG. 1F show data produced when the illustrated parts of the tracks are scanned by the beam spot. Referring to FIG. 1A, reference numeral 1 indicates a groove, 2 indicates a land, and 3 indicates a wobbling part of the groove 1. FIG. 1B shows the data reproduced when the beam spot traces the groove track 1a. FIG. 1C shows the data reproduced when the beam spot traces the land track 2b. FIG. 1D shows the data when the beam spot traces the groove track 1c. FIG. 1E shows the data reproduced when the beam spot traces a land track 2d. FIG. 1F shows the data reproduced when the beam spot traces the groove track 1e.

In this embodiment, as shown in FIG. 1A to FIG. 1F, groove tracks are wobbled intermittently so that a wobbling part and an unwobbling part are provided one after another to form a pair or combination of a wobbling part and an unwobbling part. Wobbling parts in the grooves next to each other, i.e., on opposite sides of a land track between them, are do not overlap each other in the radial direction. Specifically, a part of a groove aligned in the radial direction with a wobbling part of a next groove is not wobbled. As a result, at any point thereof, each land track is provided with a wobbling part of (the edge of) the adjacent groove only on one side, and the opposite (edge of the) groove track is not wobbled.

With the above configuration, it is possible to obtain wobble data regardless of whether the beam spot is tracing a land track or a groove track, and to recognize whether the beam spot is tracing a land track or a groove track. When the beam spot traces the groove track 1a shown in FIG. 1A, the data produced is as shown in FIG. 1B. As illustrated, address A is reproduced from the groove track part 3 which is wobbled to record address A. Address B is reproduced from the groove track parts 3 which is wobbled to record address B. No data are reproduced from the groove track parts which are not wobbled, no data are reproduced. Thus, no data, address A, no data and address B are reproduced in the stated order as the beam spot traces the track 1a. Similarly, when the beam spot traces the groove track 1c, the address C, no data, address D and no data are reproduced in the stated order.

On the other hand, when the beam spot traces the land track 2b, address C, address A, address D and address B are reproduced in the stated order.

By interpreting the groove track 1a as having address A or address B, the land track 1b as having addresses A and B, or addresses C and D, for example, the groove track 1c as having address C and D, and so on, the addresses for both the land tracks and the groove tracks can be defined.

Whether the track being traced is a land track or a groove track is known from whether the wobble data reproduced is continuous or intermittent. That is, if the wobble data is continuous the track being traced is a land track. If the wobble data is intermittent, the trace being traced is a groove track.

The wobble is modulated, e.g., frequency-modulated, with the sector address. The sector address can therefore be detected by demodulating, e.g., frequency-demodulating the reproduced signal. By having the wobble modulated with the sector management information, such as the sector address, the sector management information can be detected and extracted consistently and accurately.

Figure 2:
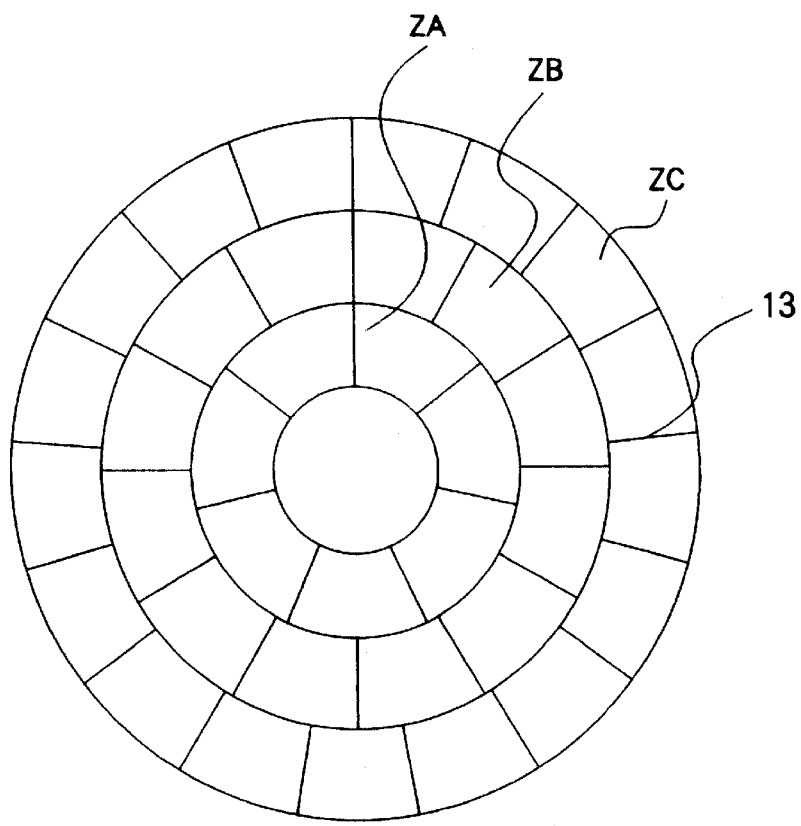
FIG. 2 is a diagram showing a sector arrangement in an optical disk according to the first embodiment of the present invention.

In the case of an optical disk having tracks divided according to their radial position, i.e., into annular zones, such as the zones ZA, ZB and ZC in FIG. 2, the sectors are aligned in the radial direction within each zone. In such a disk, if the wobblings are disposed intermittently and alternately so that they do not overlap each other between the grooves next to each other, the wobble arrangement (combination of the wobbling parts and unwobbling parts) can be aligned between the grooves next to each other.

In addition, by providing a header part 13 containing the wobbling part of the groove, at the leading end of sector, the sector address is represented by the wobbling in the header part 13, the sector address can be identified by detecting the header part during recording or reproduction. Because the sector address is identified by the wobbling, other information can be recorded in the header part 13, and thus the recording density can be increased.

Second Embodiment

Figure 3:
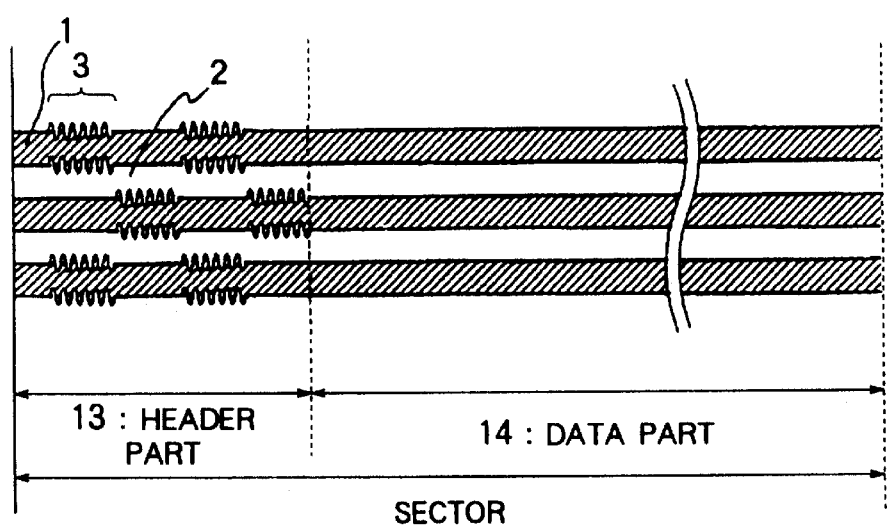
FIG. 3 shows configurations and a sector format of track sectors in an optical disk according to the second embodiment of the present invention.

FIG. 3 shows configurations of track sectors in an optical disk according to the second embodiment. Referring to FIG.

3, a sector includes the header part 13 and a data part 14. As seen from FIG. 3, the groove is wobbled intermittently in the header part 13 alone. The sector address is represented by the wobble in the header part 13. The wobble is modulated, e.g., frequency-modulated, with the address, as in the first embodiment. During recording or reproduction, the address is therefore demodulated for detection and identification.

As described in the first embodiment, in an optical disk having tracks divided into annular zones, the sector address is represented by the wobble, so that the sector addresses can be identified by detecting the wobble in the header part 13. Accordingly, other information can be recorded in the header part 13. In addition, the wobbles are not formed at the data parts 14. Accordingly, the linear recording density can be all the more increased. This is because the linear recording density must be lowered a little at track parts where wobbles are provided to ensure the same reproduced signal quality. Moreover, because the header part 13 is at the leading end of the sector, the leading end of each sector can be detected based on the signal due to the wobble.

In the first and second embodiments described above, it was assumed that the sector address is used as the sector management data. However, data other than the sector address can be used as the sector management data.

Third Embodiment

Figure 4:
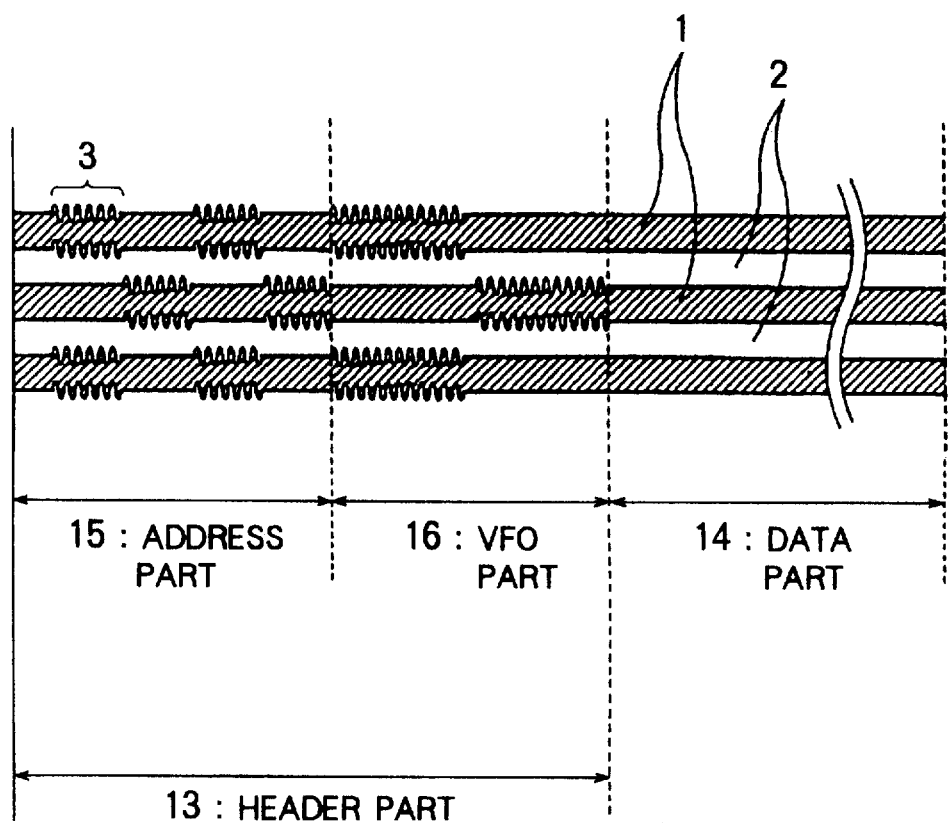
FIG. 4 shows configurations and a sector format of track sectors in an optical disk according to the third embodiment of the present invention.

FIG. 4 shows configurations of track sectors in an optical disk according to the third embodiment. In this embodiment, the header part in each sector is divided into an address part 15 and a VFO part 16. In the address part 15, a sector address is represented by the wobble which is modulated, e.g., frequency-modulated, with the sector address. The wobble in the VFO part 16 is for producing write clock during recording, and no modulation is applied to the wobble in the VFO part 16.

With the arrangement in which the header part 13 is divided into the address part 15 and the VFO part 16, by demodulating the wobble signal in the address part 15, the sector address can be consistently and accurately detected. Moreover, because no signal is superimposed with the wobble signal in the VFO part 16, the wobble information from the VFO part 16 which contains less jitter components can be used to produce write clock which is stable and accurate.

Furthermore, in the configuration shown in FIG. 4, the the length of each wobbling part in the address part 15 is different from (shorter than, in the example illustrated) the length of each wobbling part in the VFO part 16. As a result, the repetition cycle or interval of the wobbling part (i.e., the total length of a wobbling part and an unwobbling part which are arranged one after another) in the address part 15 is different from (shorter than) the repetition interval in the VFO part 16. By detecting the repetition intervals, it is possible to determine whether an address part 15 or a VFO part 16 is being traced.

In the above embodiments, data may be recorded in the header part 13. If the method of modulation and the recording density are the same as the data parts 14, the data can be recorded without being interrupted at the header parts. That is, absolutely continuous data can be recorded. This is advantageous when recording video data or audio data which are better not divided into pieces, and they can be recorded without minding the sector arrangement.

An optical disk in which dedicated address pits are formed to represent the sector addresses cannot be reproduced by a play-only disk drive apparatus, if the part with the dedicated address pits has a different data arrangement from that of a play-only disk. In contrast, if data is recorded continuously through the header parts, the disk can be reproduced by a play-only disk drive apparatus, if for instance the recording medium is of the type, such as a phase-change type, with which information is reproduced by the change in the reflectivity, provided that the data arrangement is the same as that of the play-only disk.

Fourth Embodiment

Figure 11A:
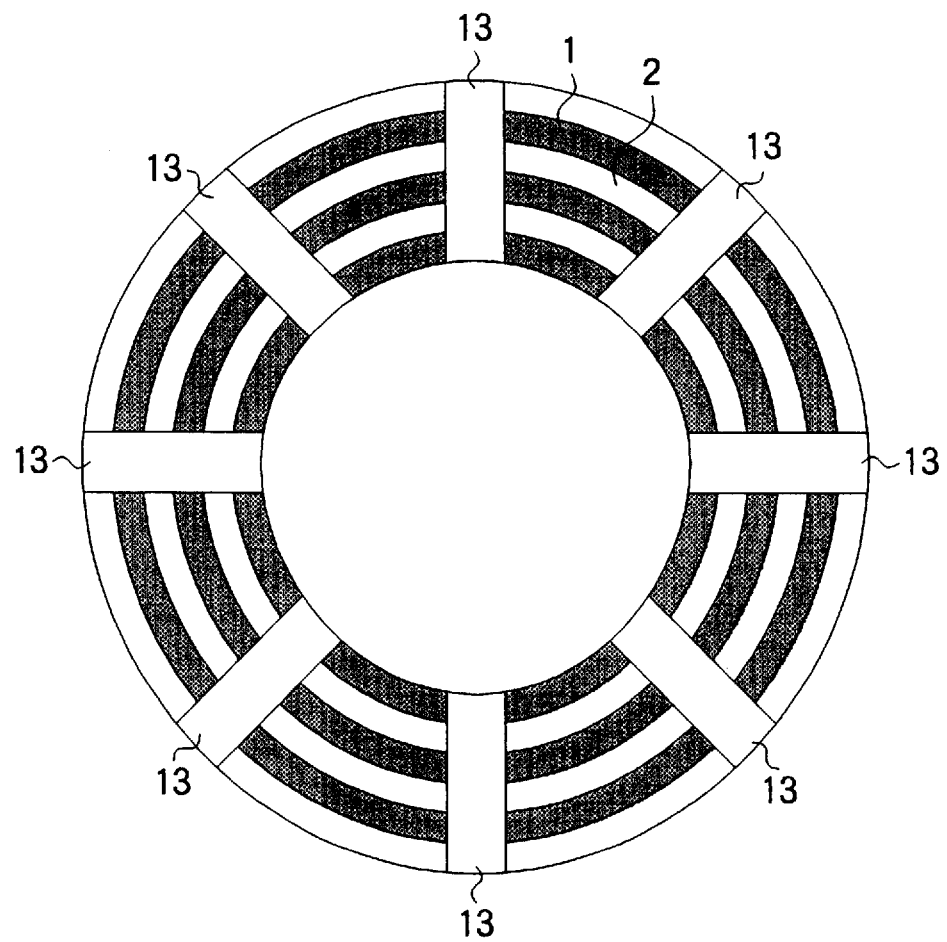
FIG. 11A to FIG. 11C are diagrams showing configurations of tracks and their sectors in conventional optical disks.
Figure 11B:
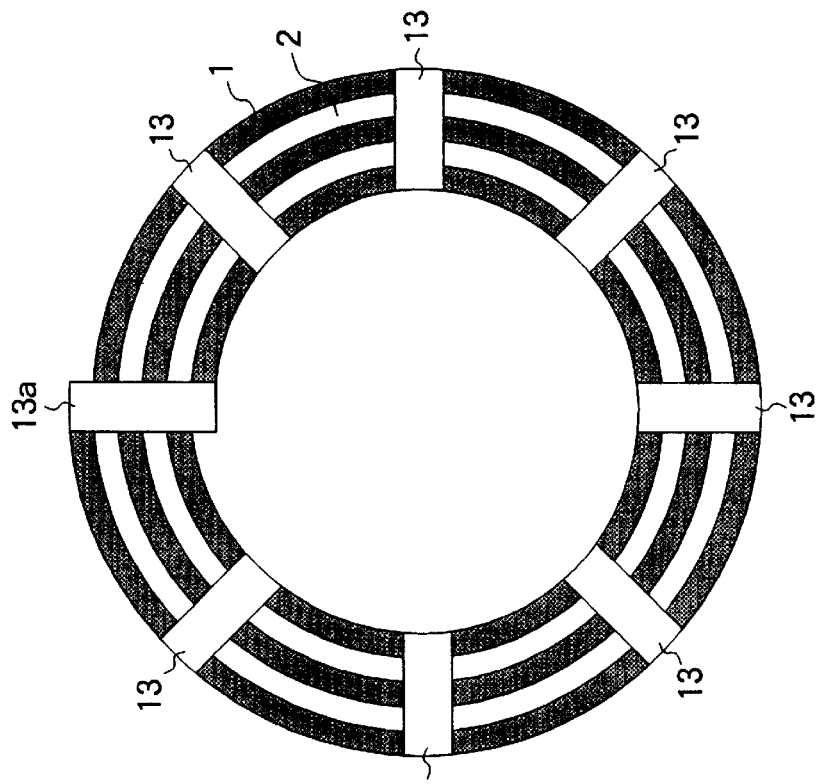
Figure 11C:
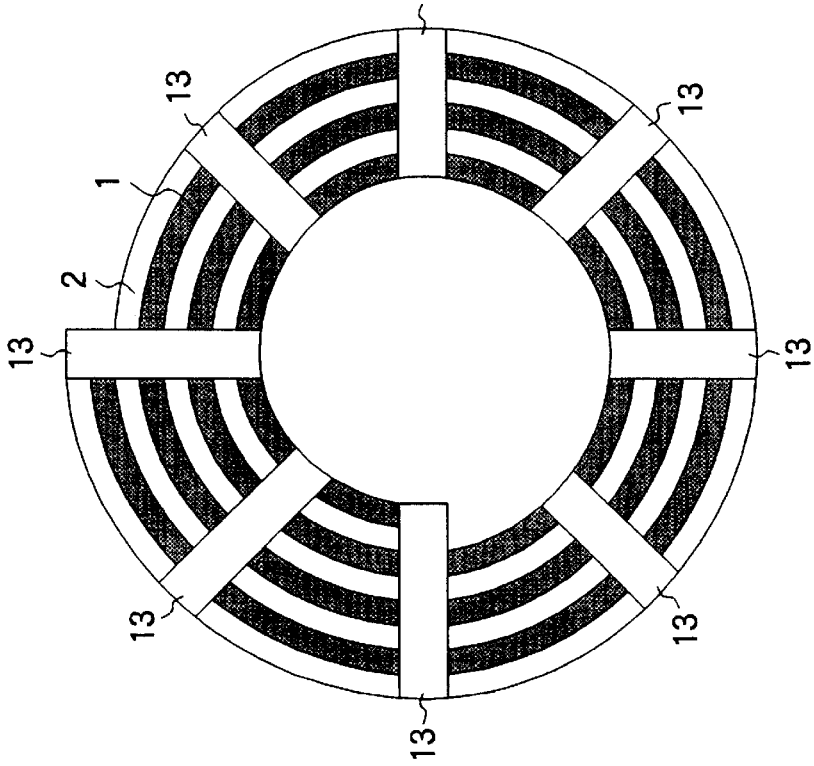
Figure 12A:
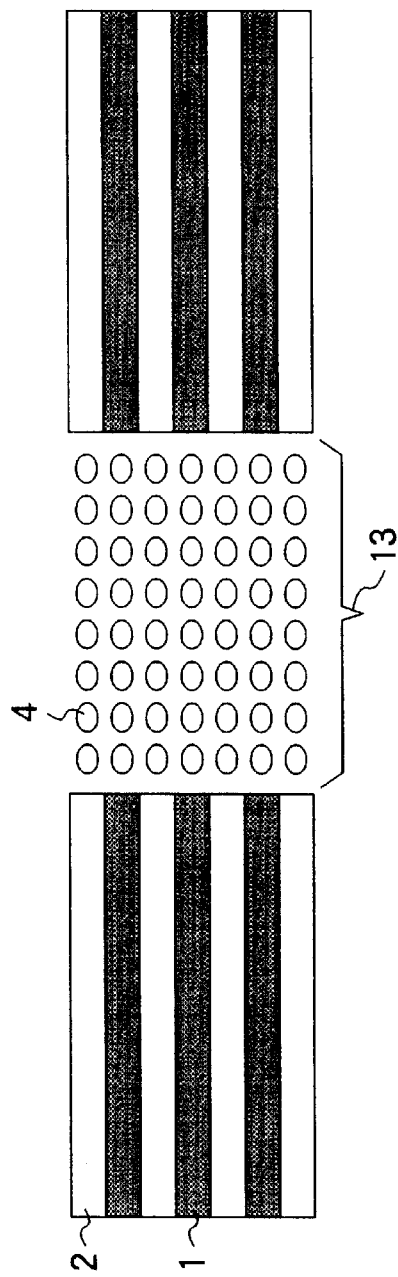
FIG. 12A and FIG. 12B show details of the header of a track sector in a conventional optical disk.
Figure 12B:
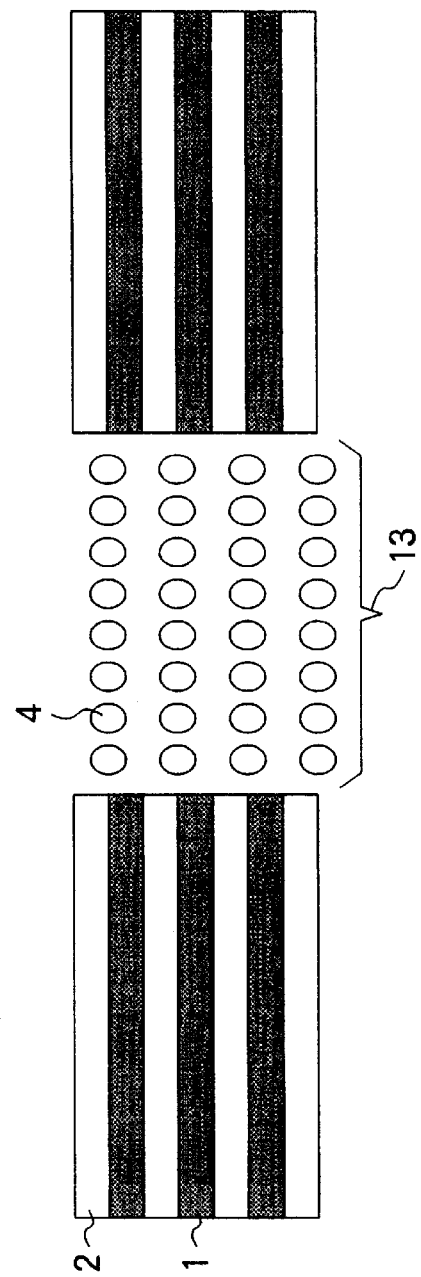
Figure 13:
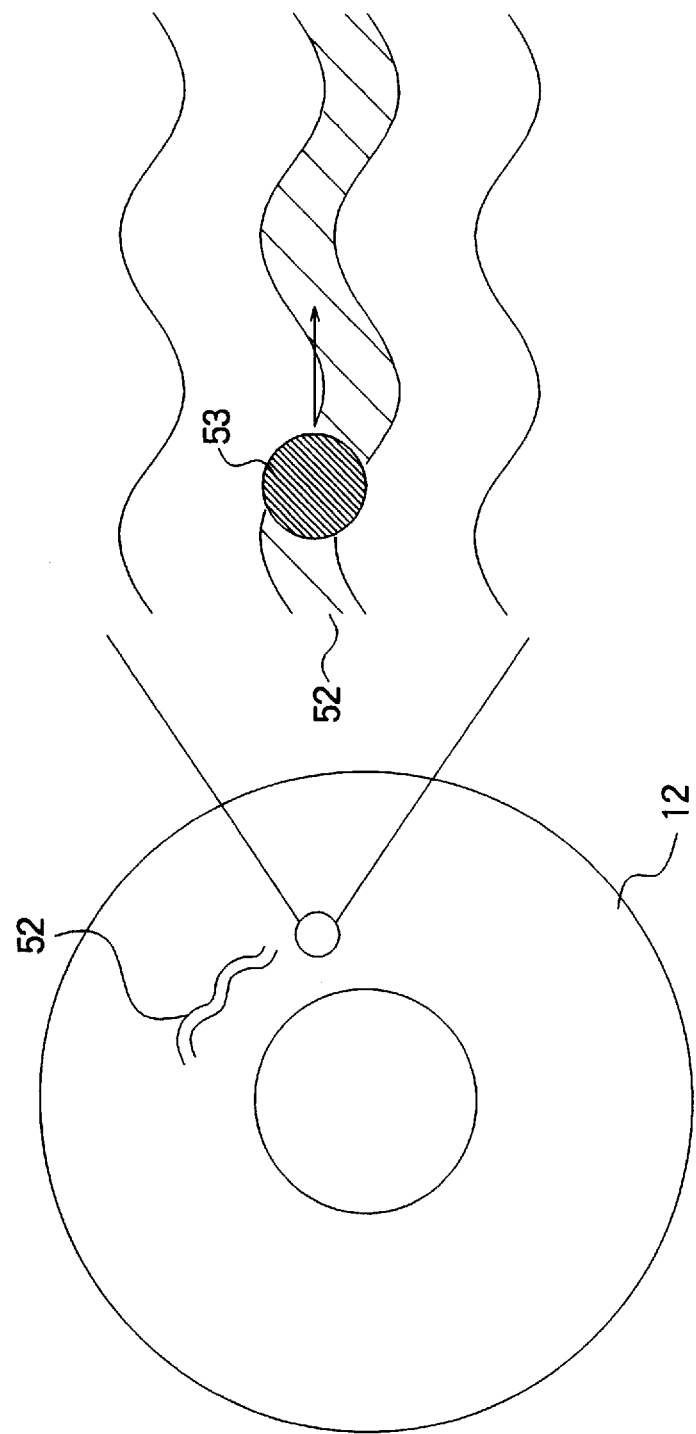
FIG. 13 shows a groove wobbling used in a conventional optical disk.

FIG. 5 shows configurations of track sectors in an optical disk according to the fourth embodiment of the present invention. In this embodiment, land and groove tracks are connected every revolution to form a continuous spiral in which land and groove tracks alternate every revolution, as shown in FIG. 11C. In this way, data is recorded along a single spiral, as in CDs, and the track jump can be effected in the same way as in CDs.

When a track is formed by a mastering device, it is sufficient if the beam spot illuminated by the laser beam is shifted by a track pitch every revolution.

In the track configurations shown in FIG. 5 in which lands and grooves are connected every every revolution, it is necessary to switch or reverse the tracking control polarity every revolution, i.e., each time the track being traced is changed from a land track to a groove track, or from a groove track to a land track. It is therefore necessary to accurately detect a connecting point 17 between land and groove tracks. If the detection of the connecting point 17 fails, tracking may fail.

If a connection mark part 18 is provided only in a track sector immediately before a connecting point, i.e., at a point where the tracking polarity is to be reversed, as shown in FIG. 6A and FIG. 6B, it is possible to determine whether the following sector is at a connecting point. FIG. 6A shows configurations of track sectors immediately before a connecting point. FIG. 6B shows configurations of other track sectors.

The wobbling period (and hence the wobbling frequency) in the groove in the connection mark part 18 are different from the wobbling periods (and hence the wobbling frequencies) in the address part 15 and the VFO part 16. For instance, by using a dedicated bandpass filter which passes only the wobbling frequency of the connection mark part 18, the wobble signal from the connection mark part 18 can be separated from other wobble signals, and the connection mark part 18 can be detected without fail.

It is also possible to make the repetition interval of the wobbling part (the total length of a wobbling part and an unwobbling part which are arranged one after another) different from those in the address part 15 or in the VFO part 16, and detect the connection mark part 18 from the difference in the repetition interval. In the example shown in FIG. 6A, the repetition interval in the connection mark part 18 is shorter than the repetition intervals in the address part 15 and VFO part 16.

As an alternative, the repetition interval in the connection mark part 18 may be made longer than the repetition intervals in the address part 15 and VFO part 16. Furthermore, the repetition intervals of the wobbling parts in the entire sector immediately before a connecting point may be made different from the repetition interval of the wobbling parts in all other sectors.

By detecting the repetition interval of the wobbling part, whether the sector being traced is immediately before a connecting point can be determined without fail.

For an optical disk which permits data recording and reproduction, a method of CLV rotation, and a method in which the disk having tracks divided into annular zones as shown in FIG. 2, and the rotational speed is varied for each zone to reduce the variation in the linear velocity have been proposed. In either method, by reproducing the wobble information, and by making the wobble signal frequency conform to a reference frequency, or by applying phase lock, rotation control can be effected.

Fifth Embodiment

Description will now be made of an optical disk drive apparatus which can be used in combination with the optical disks described above, and is capable of determining whether the sector being traced is in a land track or a groove track, extracting the write data clock, and detecting the land/groove connecting point.

FIG. 7 is a block diagram showing a structure of an optical disk drive apparatus according to the fifth embodiment of the present invention. The optical disk drive apparatus according to this embodiment is structured to determine whether a sector being traced is in a land track or a groove track, and to detect sector address, to perform data recording.

Referring to FIG. 7, the optical disk drive apparatus according to the fifth embodiment has a disk motor 19 for rotating an optical disk, an optical head 20 for recording and reproducing data and for obtaining a tracking error signal, a preamplifier 21 for amplifying a reproduced signal from the optical head 20, a bandpass filter 22 for extracting a wobble signal, an FM demodulator 23 for demodulating frequency-modulated, recorded data signal contained in the wobble signal, a data detecting and error correcting circuit 24 for detecting or extracting reproduced data from the FM demodulator 23 and correcting errors in the reproduced data, an address detector 25 for extracting address data, an envelope detector 26 for detecting the envelope of the wobble signal, a land/groove discriminator 27, a microcomputer 28, a PLL circuit 29 for generating data write clock pulses WCL from the wobble signal, a writing data buffer 30 for temporarily storing writing data, an error correction encoder 31, a data modulator 32 for modulation with record data, and a laser modulator 33 for modulating the laser beam with record data. It is assumed herein that the wobble signal on the optical disk is frequency modulated.

The operation of the above optical disk drive apparatus will now be described. First, a signal which corresponds to a tracking error signal from the optical head 20 is amplified by the preamplifier 21 having a comparatively high passband, to extract a wobble signal formed on the optical disk. Since the sector management information is superimposed with the extracted wobble signal by frequency-modulation, unnecessary noise component and the effects of recorded data which are outside of the passband are removed by the bandpass filter 22. Then, the wobble signal is frequency-demodulated by the FM demodulator 23. The reproduced wobble signal from the FM demodulator 23 is then supplied to the data detecting and error correcting circuit 24, where error correction is performed. The output of the data detecting and error correcting circuit 24 is supplied to the address detector 25, where the address data alone is extracted. In this way, the address signal is detected and extracted from the wobble signal.

As was described in connection with the first embodiment with reference to FIG. 1A to FIG. 1F, the wobble data from a land track are continuous, while the wobble data from a groove track are intermittent. By detecting the envelope of the reproduced wobble signal supplied from the bandpass filter 22 by the use of the envelope detector 26, and by finding whether the detected envelope is continuous or intermittent, the land/groove discriminator 27 determines whether the track being tracked is a land track or a groove track.

The microcomputer 28 makes a further judgment as to whether the track being traced is a land track or a groove track, based on the address signal from the address detector 25 and the result of determination from the land/groove track discriminator 27.

In recording data onto the optical disk having a spiral configuration in which land and groove tracks alternate every rotation, the result (L/G) of the determination at the land/groove discriminator 27 is supplied to a tracking controller (not shown). Based on the result of determination, the tracking polarity is set or reversed in effecting the tracking control over the optical head 20.

The use of the envelope of the reproduced wobble signal as well as the sector address data for land/groove discrimination enhances the reliability of the judgment.

The microcomputer 28 also generates a data writing start signal WST based on the address signal from the address detector 25 and a land/groove discrimination signal L/G from the land/groove discriminator 27.

The writing data used for data writing are temporarily stored in the writing data buffer 30, and read out from the writing data buffer 30 in response to the data writing start signal WST from the microcomputer 28. Then, the writing data are supplied to the error correction encoder 31, where an ECC (Error Correction Code) is appended to the writing data, and supplied to the data modulator 32. At the data modulator 32, the writing signal is used for modulation, which is started responsive to the data writing start signal WST. Then, the modulated writing signal is supplied to the laser modulator 33, and the writing data are then written into the optical disk 12 through the optical head 20.

The wobble signal from the bandpass filter 22 is also supplied to the PLL circuit 29, where clock pulses in synchronism with the wobble are generated. The generated clock pulses are used as data writing clock pulses WCL. Since these clock pulses are in synchronism with the wobble, the frequency of the clock pulses can be matched to the shortest recording pit length, regardless of the angular velocity of the optical disk. Thus, even in the CAV (Constant Angular Velocity) disk, recording pits similar to those formed with CLV (Constant Linear Velocity) rotation can be formed. This is because when an original disk for mastering is cut, a laser beam used for cutting the disk is wobbled with a constant frequency while the disk is rotated at a constant linear velocity. If rotation of the optical disk which has been fabricated in this manner is controlled based on the wobble signal during data reproduction, the disk can be naturally rotated at a constant linear velocity. Even when the disk is being rotated at a constant angular velocity, by varying the frequency of the data writing pulses according to the shortest recording pit length of the disk during data recording, a constant linear recording density can be achieved.

Because the sector address is superimposed with the wobble signal, in the form of frequency modulation, the frequency-modulated signal may contain jitter, depending on the degree of the modulation. However, by adjusting the PLL response frequency range of the PLL circuit 29, precise data writing clock free from the above-mentioned jitter can be generated, and more accurate recording pits can be formed, regardless of the fluctuations in the rotation of the disk during data recording.

Sixth Embodiment

Description will next be directed to an optical disk drive apparatus for recording data onto the optical disk having a VFO part in the header parts, for extracting the write clock, which was described in connection with the third embodiment with reference to FIG. 4.

Figure 8:
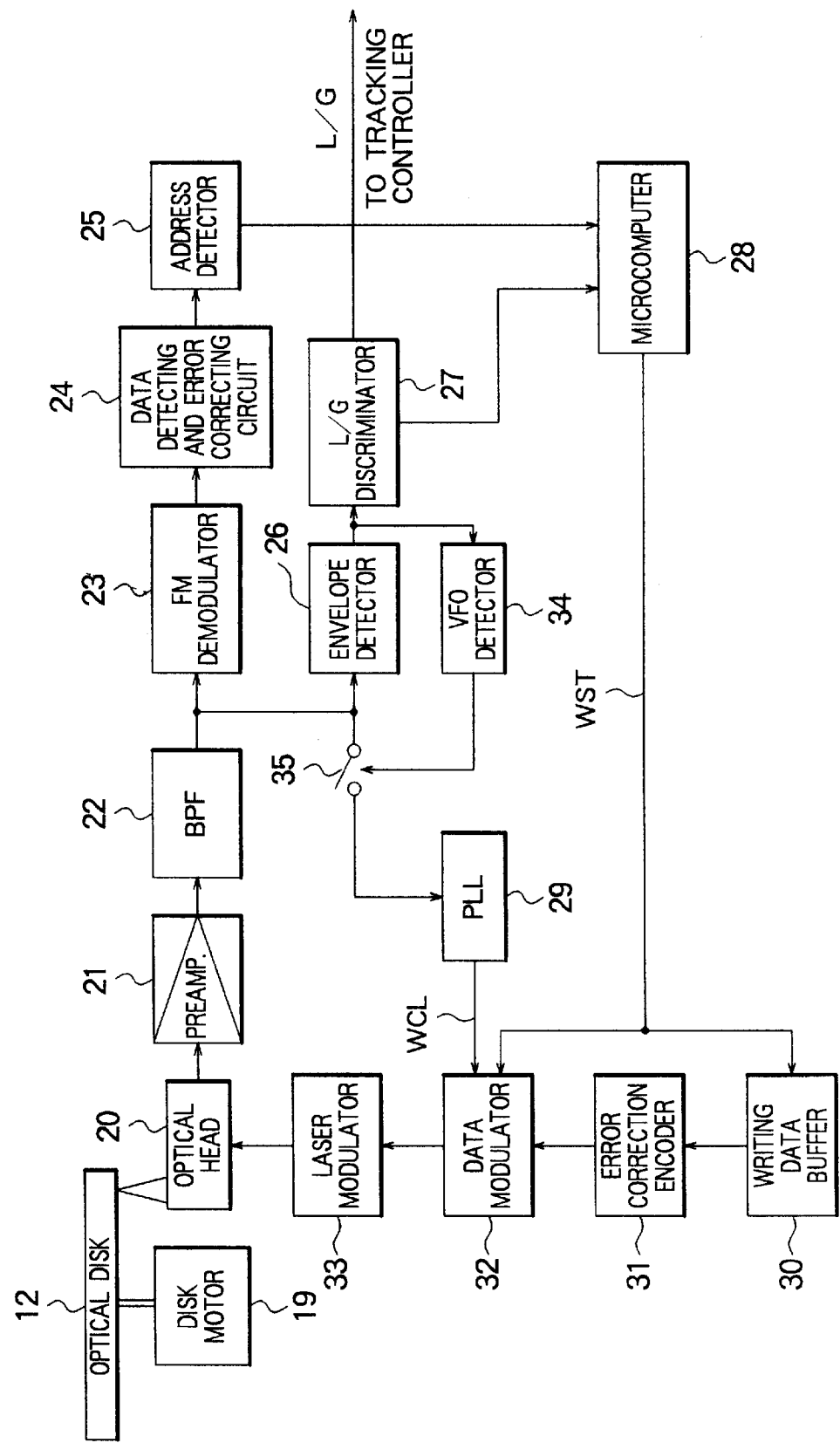
FIG. 8 is a block diagram showing a structure of an optical disk drive apparatus according to the sixth embodiment of the present invention.

FIG. 8 is a block diagram showing the structure of an optical disk drive apparatus according to the sixth embodiment of the present invention. Compared with the structure of the optical disk drive apparatus according to the fifth embodiment, illustrated in FIG. 7, the optical disk drive apparatus according to the sixth embodiment further has a VFO detector 34 for detecting that the beam spot is tracing a VFO part, and a switch 35 for selecting the wobble signal to be supplied to the PLL circuit 29, when the VFO detector 34 detects that the beam spot is tracing a VFO part. The rest of the structural elements are identical to those of the fifth embodiment, so their description is omitted. It is assumed herein that the repetition interval of the wobbling part in the VFO part is different from that in the address part, as shown in FIG. 4.

On the basis of the fact that the envelope pattern (or cycle or interval) obtained when the beam spot is tracing a VFO part, and the envelope pattern (cycle or interval) obtained when the beam spot is tracing address part are different, the VFO detector 34 determines whether or not beam spot is tracing a VFO part, based on the envelope pattern data from the envelope detector 26, during recording or the like. When the beam spot is found to be tracing a VFO part, the switch 35 is closed to supply the wobble signal to the PLL circuit 29.

Since the data writing clock pulses are generated in this way from the wobble signals which have been produced from the VFO parts 16 and have not been frequency-modulated, accurate data writing clock pulses WCL containing less jitter can be obtained, and recording pits can be formed more accurately, regardless of the fluctuations of the rotation of the disk during data recording.

Seventh Embodiment

In this embodiment, description is directed to an optical disk drive apparatus for recording data onto the optical disk described in connection with the fourth embodiment and with reference to FIG. 6, in which land and groove tracks alternate every revolution to form a continuous spiral.

Figure 9:
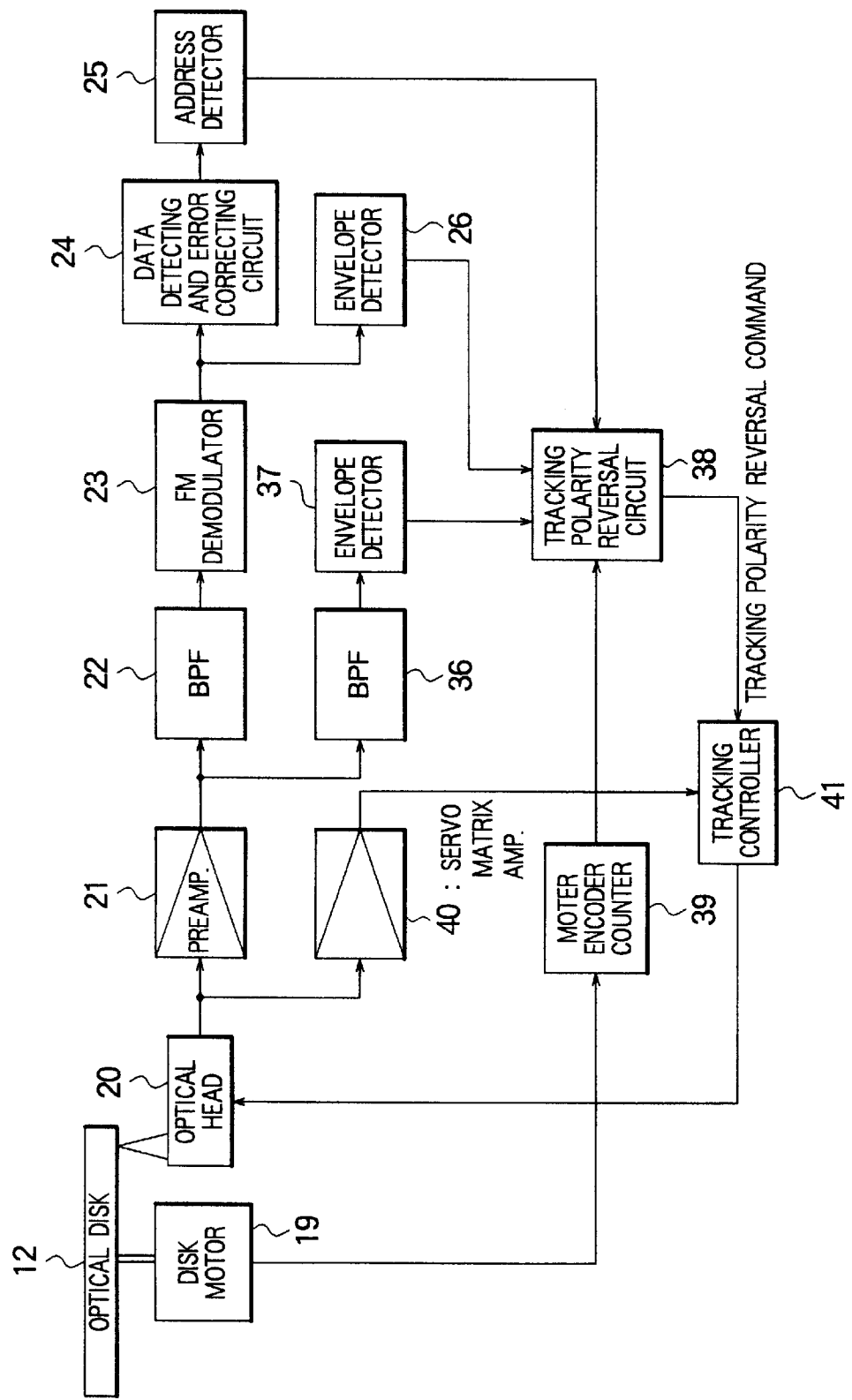
FIG. 9 is a block diagram showing a structure of an optical disk drive apparatus according to the seventh embodiment of the present invention.

FIG. 9 is a block diagram showing the structure of an optical disk drive apparatus according to the seventh embodiment. Referring to FIG. 9, a bandpass filter 36 extracts a wobble signal which has been produced from the connection mark part 18. An envelope detector 37 extracts the envelope of a reproduced wobble signal from the connection mark part 18. A tracking polarity reversal circuit 38 supplies a command for reversing the tracking polarity. A motor encoder counter 39 detects the rotation phase of the disk motor 19. A servo matrix amplifier 40 amplifies tracking sensor signals from the optical head 20. A tracking controller 41 controls the tracking through the optical head 20. It is assumed that the optical disk 12 has a spiral configuration, in which land and groove tracks alternate every revolution. It is also assumed that the frequency of the wobble in the connection mark part 18 is different from the frequency of the wobble in the address part 15 or the VFO part 16.

The operation of the optical disk drive apparatus according to this embodiment is next described. The reproduced wobble signal from the connection mark part 18 having a frequency which is different from the frequency of the wobble signal produced from the address part 15 or the VFO part 16 is extracted by the bandpass filter 36. Then, the envelope of the reproduced wobble signal from the connection mark part 18 is detected by the envelope detector 37. Based on the level (magnitude) of the envelope, the tracking polarity reversal circuit 38 determines whether or not the wobble signal has been produced from the connection mark part 18. In other words, at the tracking reversal circuit 38, it is determined whether or not the sector is immediately before a land/groove connecting point 17. This determination based on the output of the envelope detector 37 is herein called determination A.

FIG. 10A to FIG. 10F show signals produced from the bandpass filter 22 and the bandpass filter 36 and the result of determination A at the tracking polarity reversal circuit 38 when the beam spot traces a connecting point 17 from a groove track to a land track (FIG. 10A to FIG. 10C) and when the beam spot traces a connecting point 17 from a land track to a groove track (FIG. 10D to FIG. 10F). The outputs of the bandpass filter 22 are shown in FIG. 10A and FIG. 10D, while the outputs of the bandpass filter 36 are shown in FIG. 10B and FIG. 10E. The reproduced output of the wobble signal is intermittent as shown at 45 in FIG. 10A, when the beam spot is tracing a groove track, and is continuous as shown at 50 in FIG. 10D, when the beam spot is tracing a land track.

The output of the bandpass filter 36 is shown in FIG. 10B and FIG. 10E. A reproduced output shown at 46 or 51 is obtained at sector immediately before a connecting point 17. Specifically, from a groove track immediately before a connecting point, a reproduced output 46 shown in FIG. 10B is output from the bandpass filter 36. On the other hand, from a land track sector immediately before a connecting point, a reproduced output 51 shown in FIG. 10E is output from the bandpass filter 36.

By envelope-detecting the signals 46 or 51, the tracking polarity reversal circuit 38 makes the determination A as to whether or not a connecting point is being traced, and hence whether or not the tracking polarity is to be switched, and supplies a tracking polarity reversal command shown in FIG. 10C and FIG. 10F, to the tracking controller 41. In response to the tracking polarity reversal command, the tracking control polarity of the tracking controller 41 is reversed.

A failure in the tracking polarity reversal will cause a beam spot to deviate off the track. In order to prevent such a failure of tracking, the optical disk drive apparatus can be so structured as to perform tracking polarity reversal determinations or connection point determinations in multiple ways. For example, besides the tracking polarity reversal determination A as to the presence or absence of the wobble in the connection mark part 18, a connecting point determination B can also be made based on whether the beam spot is tracing a position which is at the rotation angle of the connecting point, based on the rotation phase of the disk motor 19, as detected by the motor encoder counter 39.

In addition, since land and groove tracks alternate every revolution, a connecting point determination C can also be made, based on the number of sectors per revolution, and the sector address detected by the address detector 25. Further, a connecting point determination D can also be made by referring to the output of the envelope detector 26 and by counting the number of headers, until a predetermined number is reached from the last connecting point.

By effecting the connecting point determinations in a plurality of ways, the more stable and correct determination as to the connecting point can be made.

In the seventh embodiment, it is assumed that the frequency of the wobble in the connection mark part 18 is different from the frequency of the wobble in the address part 15 or the VFO part 16, and connecting points are detected based on the frequency difference. If the repetition interval of the wobbling parts in the connection mark part 18 is different from the repetition interval of the wobbling parts in the other parts of the sector, connecting points can be detected in the following manner. That is, based on the envelope pattern (interval) detected by the envelope detector 26, the tracking polarity reversal circuit 38 detects a connecting point. Specifically, when the tracking polarity reversal circuit 38 finds that the envelope pattern (interval) being detected is different from the envelope pattern (interval) that were detected when the beam spot was tracing other part, then it determines that a connecting point is at a next sector. In such a case, it is not necessary to provide the bandpass filter 36 and the envelope detector 37, shown in FIG. 9.

While particular embodiments of the invention have been shown and described, it will be obvious to those skilled in the art that changes and modifications may be made without departing from the invention in its broader aspects. The appended claims are therefore intended to cover all such changes and modifications as fall within the true spirit and scope of the invention. The matter set forth in the foregoing description and accompanying drawings is offered by way of illustration only and not as a limitation on the scope of the invention. The actual scope of the invention is intended to be defined in the following claims.

What is claimed is:

1. An optical disk comprising:
   groove tracks formed on the optical disk, each groove track being divided into a plurality of sectors to form data recording units, each sector having a header part containing a wobbled portion adjacent to an unwobbled portion to signify the physical address of the sector; and
   land tracks positioned between said groove tracks, each land track being divided into a plurality of sectors to form data recording units; wherein
   the wobbled portions of radially consecutive groove track sectors are offset from each other in the linear direction.

2. The optical disk according to claim 1, wherein the wobbled region of a groove sector is frequency-modulated to signify an address.

3. The optical disk according to claim 1, wherein the header part of a sector further includes a wobbled region which signifies a clock signal.

4. The optical disk according to claim 1, wherein when the header part of a groove or land track sector is traced by a light beam, the header part signifies whether the track being traced is a groove track or a land track based on whether wobble data is continuously or intermittently produced.

5. The optical disk according to claim 1, wherein data is recorded within the header part of a groove track sector.

6. The optical disk according to claim 1, wherein
land and groove tracks alternate every revolution to form a continuous information recording spiral, and
a track sector immediately preceding a connection point between a groove track revolution and a land track revolution includes a connection mark part formed of a wobbled portion having a wobbling period which is different than that of the wobbled portion of the sector's header part.

7. The optical disk according to claim 1, wherein
land and groove tracks alternate every revolution to form a continuous recording spiral, and
a track sector immediately preceding a connection point between a groove track revolution and a land track revolution includes a combination of a wobbled portion and unwobbled portion, the total length of which is different than that of a sector not immediately preceding a connection point.

8. The optical disk according to claim 1, wherein
the tracks on the disk are divided into a plurality of annular zones, and
each sector includes a wobbled part and an unwobbled part one after another.

9. The optical disk according to claim 1, wherein the groove wobble include a first part which is modulated with sector management information, and a second part which is not modulated, and said second part is at the start of the sector.

10. An optical disk comprising:
    grooves formed on a surface of the disk; and
    lands positioned between said grooves, information recording tracks being formed both in said grooves and on said lands, the information recording tracks each having a plurality of track sectors respectively forming information recording units; wherein
    said grooves are wobbled in a radial direction of the disk to represent rotation and sector management information of the disk such as a sector address,
    at least one pair of a wobbled Tart and an unwobbled part arranged one after another are provided every revolution, such that wobbled parts in the grooves next to each other do not overlap in the radial direction of the disk,
    the tracks on the disk are divided into a plurality of annular zones,
    land and groove tracks alternate every revolution to form a continuous information recording spiral, and
    a track sector immediately before a connecting point between a land and groove track has a connection mark part formed of a wobbled part having a wobbling period different from the wobbling period of the wobbled part representing the sector management information and the wobbled part representing the disk rotation information.

11. An optical disk, comprising:
    grooves formed on a surface of the disk; and
    lands positioned between said grooves, information recording tracks being formed both in said grooves and on said lands, the information recording tracks each having a plurality of track sectors respectively forming information recording units; wherein
    said grooves are wobbled in a radial direction of the disk to represent rotation and sector management information of the disk such as a sector address,
    at least one pair of a wobbled part and an unwobbled part arranged one after another are provided every revolution, such that wobbled parts in the grooves next to each other do not overlap in the radial direction of the disk,
    the tracks on the disk are divided into a plurality of annular zones, land and groove tracks alternate every revolution to form a continuous information recording spiral, and the total length of a wobbled part and an unwobbled part which are arranged one after another in a part of a sector immediately before a connecting point is different from the total length of a wobbled part and an unwobbled part which are arranged one after another in other sectors.

12. An optical disk comprising:

grooves physically formed on a surface of the disk; and lands positioned between said grooves, information recording tracks being formed both in the grooves and on the lands, the information recording tracks each having a plurality of track sectors respectively forming information recording units; wherein the information recording tracks include intermittent wobbled regions, said wobbled regions include regions which are not frequency-modulated, said wobbled regions represent a rotation control signal which ensures, during playback of signals, that the disk is rotated at a constant linear velocity, and said wobbled regions which are not frequency modulated represent a reference clock used for writing during signal recording.

13. The optical disk according to claim 12, wherein each track sector includes plural wobbled regions.

14. The optical disk according to claim 12, wherein each track sector includes a first portion having a wobbled region and a second portion without a wobbled region.

\* \* \* \* \*